Aug. 30, 1938.　　E. DE H. CALDWELL　　2,128,691
SAW
Filed March 11, 1936　　5 Sheets-Sheet 5
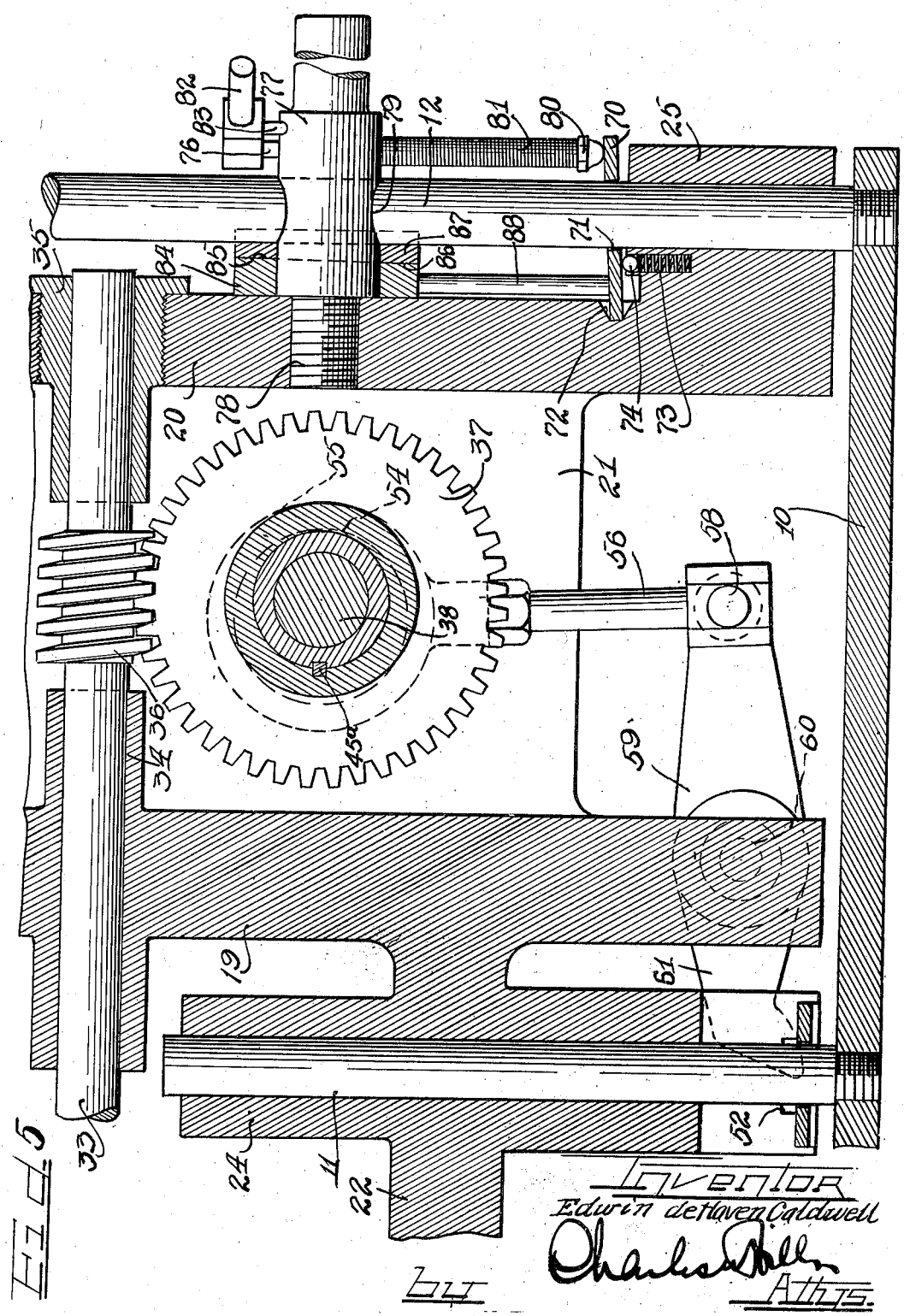
Inventor
Edwin deHaven Caldwell Patented Aug. 30, 1938

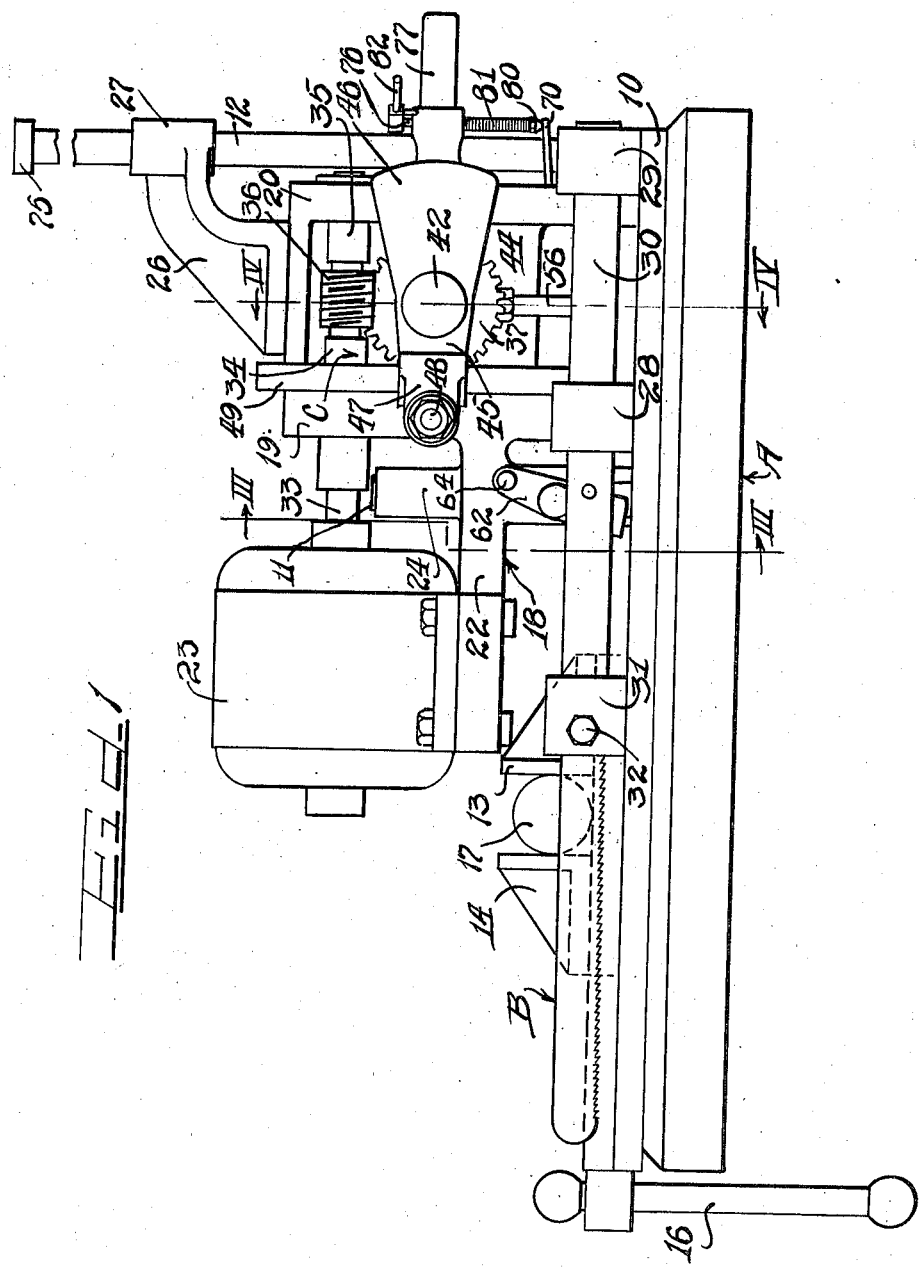

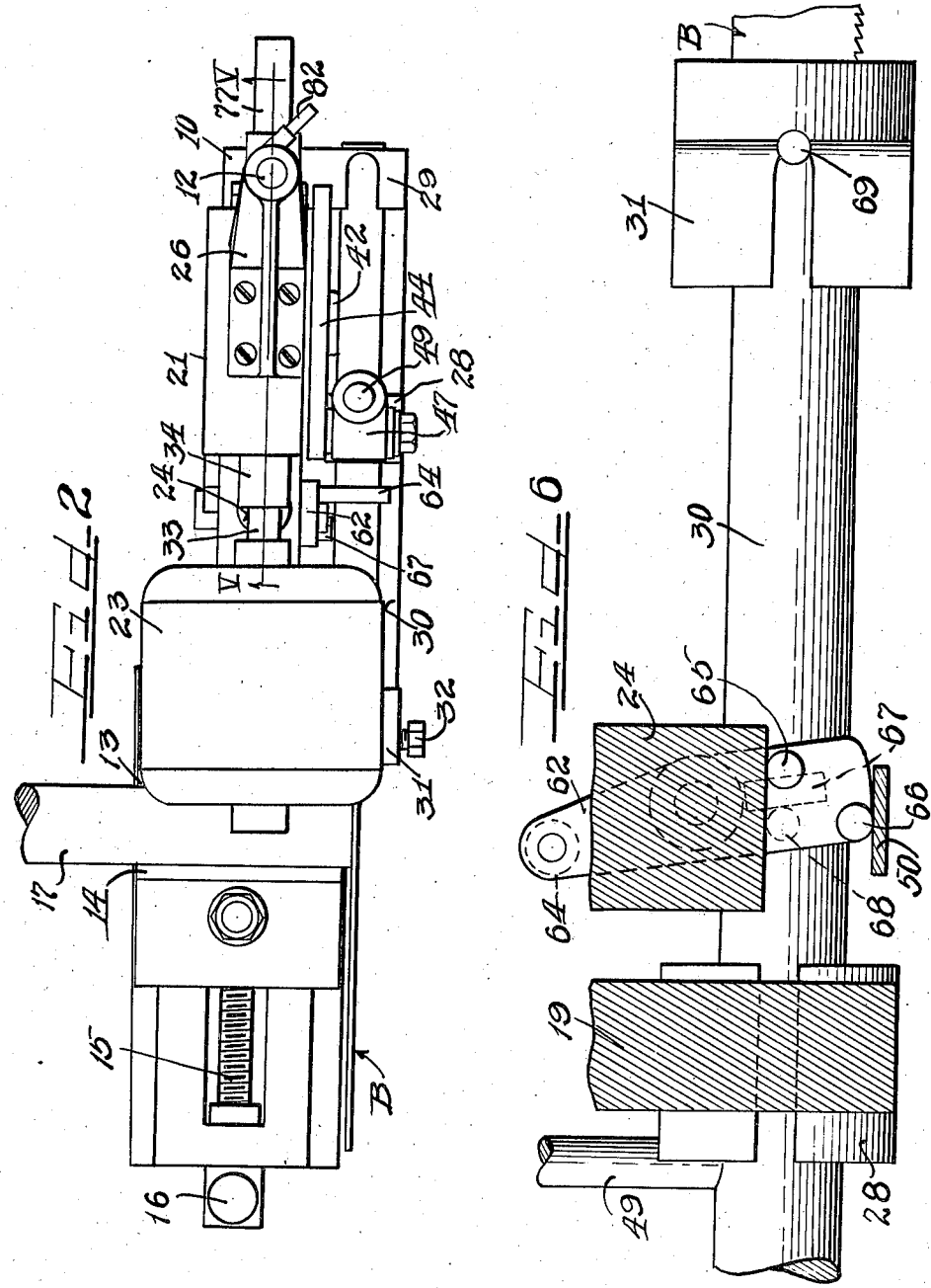

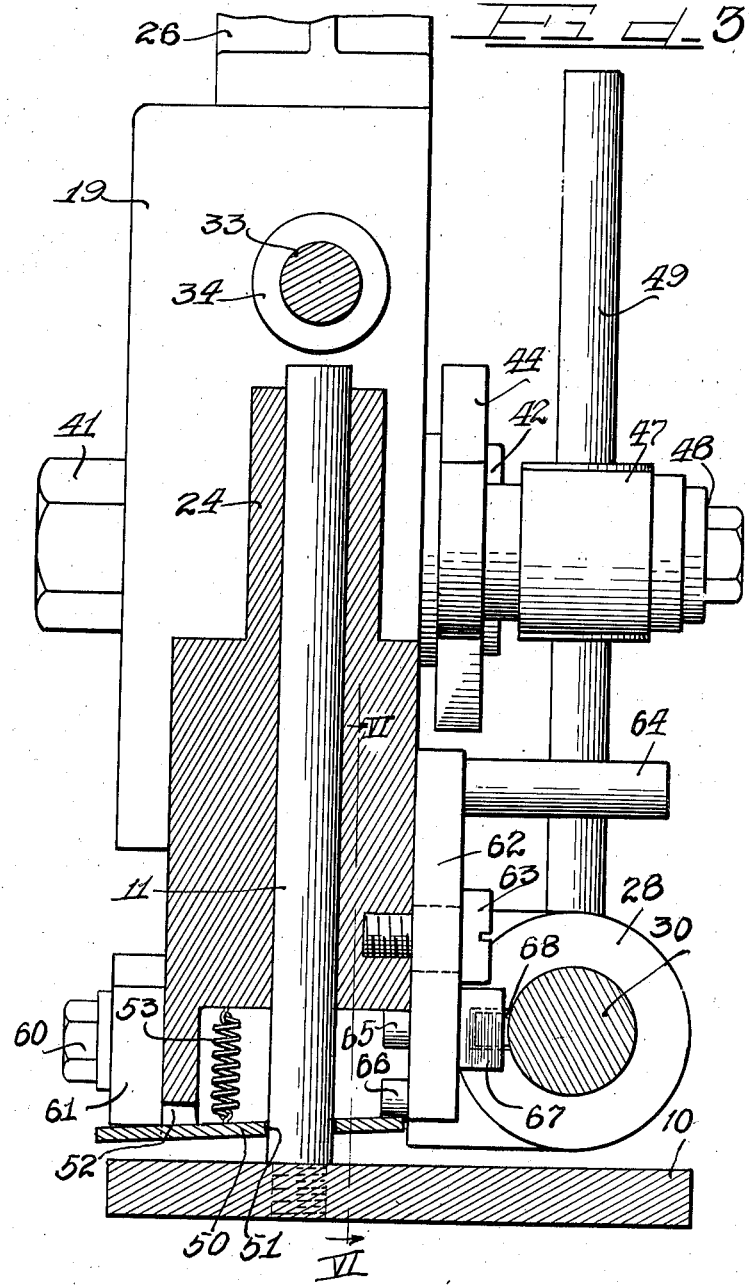

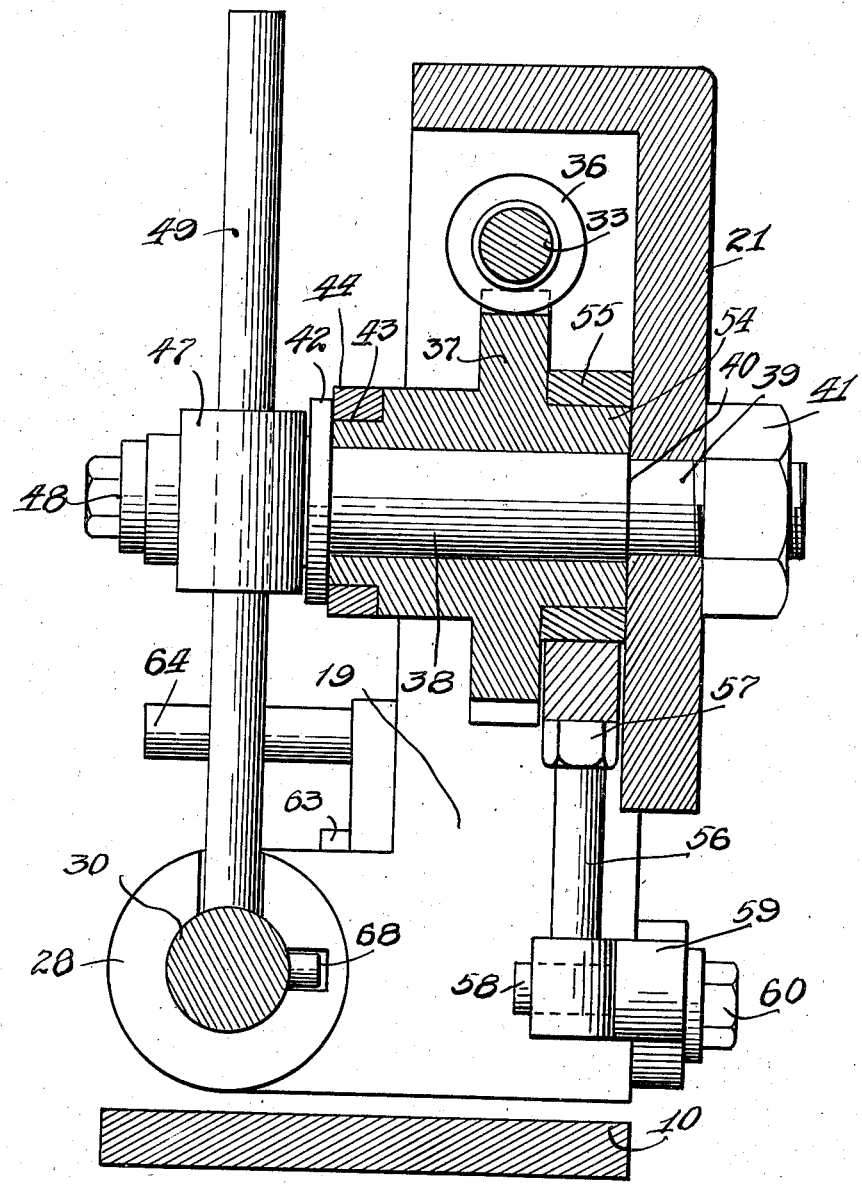

2,128,691

UNITED STATES PATENT OFFICE 2,128,691

SAW

Edwin de Haven Caldwell, Fredonia, N. Y., assignor to Mohawk Equipment Corporation, a corporation of Illinois Application March 11, 1936, Serial No. 68,163

10 Claims. (Cl. 29—73)

The present invention relates in general to a saw and improved operating mechanism therefor, and is more particularly concerned with a hack saw of the type utilized for sawing metals. In the past, saws of this type which were capable of being used for heavy duty work, such as for sawing rails, stainless steel and the like, were so cumbersome and of such heavy construction that they were not readily portable. For this reason, it has been the custom to mount the saw in a more or less convenient location and bring the work to the saw. Such practice was decidedly inefficient and expensive, especially where the members to be cut were very heavy, as the members would oftentimes have to be moved from the job to the saw and then back again.

With a view to overcoming the objections to and the disadvantages of the present practice, this invention contemplates a heavy duty saw which is of comparatively inexpensive construction, which is readily portable, and which may be moved without difficulty or hardship from one job to another, as required. In other words, the saw embodying the principles of the present invention may be taken to the work rather than resorting to the present inefficient practice of carrying the work to the saw.

It is a further object of the present invention to provide a saw and driving mechanism therefor of such construction that the weight of the driving mechanism may be utilized to force the saw, during the cutting stroke, into the material being cut.

A further object resides in the provision of a saw of the herein described type, wherein the blade is attached at one end only to the operating mechanism and arranged to cut the material only on the pull stroke, thereby enabling the use of broken off or partial blades.

Another object of the invention is to provide improved means for raising the saw blade and operating mechanism as a unit relative to the material being cut, when the cutting stroke is terminated; the blade and mechanism being retained in raised position during the return stroke of the blade and at the termination thereof automatically lowered to bring the saw teeth into engagement with the work.

It is also an object to provide a saw of this type wherein the blade is automatically lowered into engagement with the work and wherein the forces operating to push the blade into the work may be regulated to a greater or less value as desired, depending upon the kind of material being cut.

A still further object is the provision of improved means, operated by the power means of the driving mechanism, for automatically raising the saw and driving mechanism as a unit to enable material to be placed in position for cutting.

Other objects and advantages of the present invention will more fully appear from the following detailed description taken in connection with the accompanying drawings which illustrate a single embodiment thereof, and in which:

Figure 1 is an elevational view of a device embodying the features of the present invention;

Figure 2 is a plan view of the same;

Figure 3 is a transverse sectional view taken through the device substantially on the line III—III of Figure 1;

Figure 4 is an enlarged transverse sectional view taken through the device substantially on the line IV—IV of Figure 1;

Figure 5 is an enlarged partial longitudinal section through the driving mechanism, taken substantially on the line V—V of Figure 2; and Figure 6 is an enlarged fragmentary view, partly in section, showing details of the mechanism for controlling the raising and lowering of the frame, power means and saw blade as a unit, taken substantially on the line VI—VI of Figure 3.

As shown on the drawings:

In the illustrated embodiment of the present invention, there is shown in Figure 1 a hack saw which in general comprises a frame structure A, a hack saw blade B and a driving mechanism C for operating the blade. The frame structure is composed of two parts, a stationary part and a movable part. The stationary part comprises a bed plate 10 to which is secured a pair of upright guide members 11 and 12, these guide members being spaced apart and secured to the bed plate 10 by screw connections at their lower ends, or by any other suitable means, so as to form a rigid connection with the bed plate.

As shown in Figures 1 and 2, one end of the bed plate 10 is provided with a vise of a conventional design and comprising a stationary jaw 13, a movable jaw 14, and a screw 15 which is arranged to threadedly engage a nut (not shown) on the movable jaw. The screw is manually operable by means of a suitable handle 16, whereby the jaws may be actuated into clamped and unclamped position relative to the material to be sawed, in this instance the material disclosed being a steel rod 17. It will be noted that when the material is clamped in the jaws of the vise, it is held in proper position for sawing by the blade B.

The movable portion of the frame structure is generally indicated at 18 and comprises spaced upright members 19 and 20 which are interconnected at their upper ends and back side by a web portion 21, as clearly shown in Figure 4. The upright 19 is laterally extended to form an arm portion 22 for supporting a driving motor 23. Between the motor and upright 19, the arm 22 is upwardly and downwardly extended to form a bearing 24 which is adapted to slidably receive therethrough the upright 11.

Extending outwardly and integrally formed with the upright 20 is a bearing portion 25 which is adapted to slidably receive therethrough the upright 12.

The upper portion of the movable frame structure 18 is braced relative to the upright 12 by means of an angular bracket 26 which is secured at one end to the web portion 21, and at its other end is formed to define a bearing 27 which likewise is adapted to slidably receive the upright 12.

The upright frame members 19 and 20, at their lower ends, are respectively formed to define bearings 28 and 29 which are adapted to reciprocably support a rod 30 which is adapted at one end for connection to an end of the saw blade B. The connection between the reciprocable rod 30 and the saw blade is accomplished by longitudinally slotting or splitting the associated end of the rod 30 to receive therein the saw blade. A collar 31 is then fitted over this end of the rod 30, and by tightening a set screw 32, the portions of the rod defining the slot may be clamped against the saw blade.

For reciprocating the rod 30 and the blade attached thereto, the driving shaft 33 of the motor is supported in bearings 34 and 35 in the upright frame members 19 and 20, respectively. The bearing 35 is in the form of a bushing which is threadedly secured in operative position. The drive shaft carries a worm 36 which is arranged to mesh with the teeth of a main driving gear 37 which is rotatably mounted on a stationary shaft 38 having one end anchored in the vertical section of the web 21. In this instance, the shaft at this end is formed with a contracted portion 39 to define an abutment shoulder 40 which is adapted to abut the inner surface of the web 21. This end of the shaft is threaded to receive a nut 41 which may be tightened against the outer surface of the web 21. The opposite end of the shaft 38 is provided with a head portion 42 which retains the gear and associated mechanism on the shaft 38.

The front portion of the main driving gear that is shown adjacent the head 42 is formed to define a contracted portion 43 to receive thereover a crank arm 44, this arm being secured to the hub of the main driving gear by means of a key 45a, as shown in Figure 5. The crank arm 44 extends outwardly in opposite directions from the hub of the main driving gear to form a driving arm 45 and a counterweight portion 46. The main driving arm 45 is provided with a bearing 47 which is pivotally mounted, as shown at 48, to the main driving arm. This bearing slidably receives therethrough an upright rod 49 having its lower end rigidly secured in the rod 30. In the construction shown and just previously described, it will be apparent that with the motor 23 operating, the main drive shaft will rotate the worm and main driving gear, whereby the crank will rotate and cause a reciprocatory movement of the rod 30, and since the saw blade B is secured to the rod 30, the blade will likewise be reciprocated.

In addition to driving the saw blade, the electric motor also drives means for raising the movable frame, saw blade and motor as a unit at the end of the cutting stroke of the blade and lowering the unit at the termination of the return stroke of the blade or the beginning of the cutting stroke. For this purpose, there is provided a plate 50 having an aperture 51 through which extends the guide member 11. This plate has one end freely extending through a cut-out portion 52 of the lowermost end of the bearing 24 so that the plate is free to move therein. The plate is normally moved upwardly by means of a tension spring 53, one end of this spring being anchored to the lower end of the bearing 24, and the other end secured to the plate 50.

The aperture 51 of the plate is of such size that when the plate is horizontally disposed, the plate is free to move or slide along the guide member 11, but when the plate is inclined, it will frictionally grip the guide member.

As shown in Figure 4, an end 54 of the hub of the main driving gear forms an eccentric having its major radius coincident with the longitudinal axis of the driving arm 45. This eccentric portion is surrounded by a collar 55 which has attached thereto a link 56. One end of this link threadedly engages the collar and is locked in position by means of a lock nut 57 so as to make a rigid connection. The other end of the link is pivotally secured by means of a pivot pin 58 to one end of a rocker arm 59, this rocker arm being pivoted as at 60 to the rear surface of the frame member 19. The other end 61 of the rocker arm is disposed on the opposite side of the pivotal mounting 60 from the arm which is connected to the link 56, and is arranged to engage the upper surface of the end of the plate 50 which projects through the cut-out portion 52.

Associated with the other end of the plate 50 is a tripping arm 62 which is pivoted intermediate its ends on a screw 63. The uppermost end of the tripping arm 62 is provided with a crank 64 which permits manual rotation of the tripping arm. The tripping arm is restrained for limited rotational movement by means of a rearwardly projecting pin 65 which is arranged to move in an arc and at the limits of movement impinge against the lower surface of the bearing 24, as clearly shown in Figures 3 and 6. The tripping arm 62 is provided at its lower end with an additional rearwardly projecting pin 66. In one limit position of the arm 62, the pin 66 is disposed over the associated end of the plate 50 and forms an abutment for this end of the plate. In the other limit position of the arm 62, the pin 66 is moved to a position which will enable this end of the plate to move upwardly. Automatic operation of the tripping lever in timed relation to the movement of the saw blade is accomplished by providing the lowermost end of the lever with a forwardly projecting abutment portion 67 which is so positioned as to be in the line of travel of a pair of spaced pins on the rod 30, these pins being indicated by numerals 68 and 69.

Referring to Figure 6, it will be observed that the pin 68 is so disposed on the rod 30 that it engages the abutment 67 slightly before the saw blade reaches the end of the return stroke. Further movement of the saw blade to bring it to the end of its return stroke causes the arm 62 to move to its limit position, wherein the pin 66 is disposed over the associated end of the plate 50. The arm 62 is moved in the opposite direction by the pin 69. This pin is arranged on the rod 30 so as to engage the abutment 67 and move the arm 62 to its other limit position slightly before the saw blade reaches the end of its cutting stroke, thus carrying the pin 66 to a point which enables upward swinging movement of this end of the plate 50.

The operation of the mechanism for raising and lowering the saw blade, frame and power means as a unit will now be described.

Assuming that the driving gear 37 is rotating in a counterclockwise direction with the eccentric in the upper half of its cycle, the saw blade will be on its return stroke in raised relation to the work. The plate 50 is at this time inclined so as to grippingly engage the guide member 11.

When the eccentric reaches the position shown in dotted lines in Figure 5, the saw blade will be at the end of its return stroke, and the arm 62 will have been moved to the position shown in Figures 3 and 6, wherein the pin 66 is disposed over the associated end of the plate 50.

As the blade now starts on its cutting stroke, the eccentric continues to move the end 61 of the rocker arm 59 upwardly, whereupon the frame is further lowered to apply a gradually increasing pressure to the blade and force it into the work. This downward movement of the frame causes the pin 66, which moves downwardly with the frame, to engage the end of the plate 50 and swing it to a horizontal position. The plate in this position is released relative to the guide member 11, and the entire weight of the frame and power means is applied to the blade until just prior to the blade's reaching the end of its cutting stroke.

A short distance from the end of its cutting stroke, the pin 69 actuates the arm 62 to move the pin 66 from above the associated end of the plate 50 whereupon the spring 53 acts to swing the plate 50 counterclockwise about its point of engagement with the end 61 of the rocker 59 into an inclined position gripping the guide member 11. The plate now becomes the fulcrum for the rocker 59, and since its end, which is connected to the eccentric is being moved upwardly, the frame, power means and saw blade start to raise as a unit. This action gradually decreases the pressure applied to the blade at the end of the cutting stroke.

The blade being now raised from the work starts on its return stroke, reaching a maximum raised position substantially at the middle of the return stroke. The eccentric then starts lowering the frame to again bring the saw into the work, which it does when the eccentric reaches the position shown in dotted lines in Figure 5. The pressure is gradually applied to the blade at the beginning of its cutting stroke, after which the pin 66 acts to again move the plate 50 to horizontal position and apply full pressure to the plate, as before explained. This cycle of operation is continued until the sawing operation is completed or until the saw has moved to its lowest position against the bed plate 10.

The gradual application of pressure to the blade at the beginning of the cutting stroke prevents chattering or jamming of the blade and obviates the breaking of teeth on the blade, as might happen if the entire weight of the frame, power means, etc., were suddenly applied. This feature together with the decrease of pressure on the blade at the end of its cutting stroke provides a very efficient sawing cycle and enables the application of the greatest pressure to the blade during the time in its cutting stroke when its linear movement is relatively large as compared to its movement near the beginning and end of its cutting stroke.

It will be apparent that the angle of inclination of the plate 50 when it grips the guide member 11, and hence the height of its end that is engaged by the pin 66, may be determined by the size of the aperture 51. It is therefore possible by the use of plates having different sized apertures to vary the distance the blade will travel at the beginning and end of its cutting stroke during which the pressure will be gradually applied and relieved.

The plate 50 is also actuated when it is desired to raise the movable frame 18 and the parts connected thereto, including the saw blade, for the purpose of inserting the material into the device to be sawed. When raising the saw blade for this purpose, the lowering of the blade is prevented by providing a plate 70 which works in the same manner as the plate 50, except that the plate 70 is associated with the guide rod 12 instead of the guide rod 11. The plate 70 is similarly provided with an aperture 71 arranged to receive therethrough the guide rod 12. One end of the plate 70 is rockably secured within a recessed portion 72 in the frame member 20.

As shown in Figure 5, an expansion spring 73 is disposed in a suitable recess in the bearing 25 with its upper end bearing against a contact ball 74 which is arranged to bear against the underside of the plate 70 and force the plate to move pivotally in a counter-clockwise direction. This arrangement, it will be apparent, will permit the frame 18 to move upwardly on the guide 12, but due to the tilting of the plate 70 by the spring 73, movement of the frame and parts connected thereto, including the saw blade, in a downward direction will be prevented. It will therefore be evident that, with the plate 70 free to operate, the frame will be held in raised position each time it is raised by the eccentrically actuated rocker arm 59. In other words, since the frame is retained in raised position each time it is raised, the mechanism for returning the plate 50 to horizontal or released position will be rendered ineffective, and the frame, motor, saw blade and driving mechanism will be raised as a unit in a succession of steps or movements until the bearing 27 on the bracket 26 impinges against a stop 75 at the upper end of the guide 12.

In order to release the frame 18 so that it may move downwardly on the guides 11 and 12, it is only necessary to push the outer end of the plate 70 downwardly so that the plate will assume a substantially horizontal position in which it will be freed from its gripping action with the guide 12. Release means are provided which comprise a rod 76 which extends through and is rotatably supported in a handle 77, which handle is threaded at one end, as shown at 78, and by means of which it threadedly engages the frame member 20. The handle is apertured, as shown at 79, for receiving therethrough the guide 12.

The rod 76 is provided at its lower end with a head portion 80 which affords an abutment for one end of an expansion spring 81, the other end of this spring abutting the handle 77. The upper end of the rod 76, which is disposed on the opposite side of the handle from the spring 81, carries a right-angularly extending digitally operable member 82 which permits manual rotation of the rod 76. On the undersurface of the member 82 is a downwardly extending pin 83 which is of sufficient length to engage the arcuate surface of the handle 77. It will be evident that when the member 82 is rotated so as to be in alignment with the handle 77, the riding of the pin 83 on the handle surface, which is arcuate, will cause the member 82 to be raised. This action causes a compression of the spring 81 due to the raising of the rod 76, whereupon the plate 70 would be actuated upwardly to grip the guide 12. On the other hand, if the member 82 is rotated in a clockwise direction out of alignment with the handle 77, then the spring 81 forces the rods 76 downwardly and the plate 70 is moved to an approximately horizontal position, wherein its gripping action on the guide rod 12 is released.

Under normal operating conditions of the saw, when sawing a piece of material, the member 82 would be in such a position as to maintain the plate 70 in released position, thus enabling the eccentrically actuated rocker arm and tripping lever to cooperate in alternately raising and lowering the saw blade on its return and cutting strokes, respectively. However, when it is desired to raise the structure for inserting other material to be sawed, the member 82 is rotated in a counter-clockwise direction so that the plate 70 will be released, and is actuated by the spring 73 to such a position as to cause it to grip the guide 12 each time the frame structure is raised by the action of the eccentrically actuated rocker arm 59.

Since the movable frame structure with the motor operating mechanism and saw blade represent a considerable weight, it is desirable to cushion the downward movement of the frame on the guides when cutting light material, and when the frame structure is being lowered after it has been raised to insert new material to be cut. This is accomplished by providing an annular collar 84 on the handle 77 between the frame member 20 and guide 12. This collar is rotatable on the handle and has a cam surface 85 which engages a cooperating surface 86 on an abutment washer 87 having its other side formed to fit partly around the guide 12. Rotation of the collar 84 is accomplished by means of a handle 88 having one end secured to the periphery of the collar. It will be evident that when the collar 84 is rotated, the inter-action of the cam surfaces will tighten the abutment washer 87 against the guide 12, and by this means the lowering movement of the frame structure may be retarded so that the saw blade will not be brought into engagement with the material to be cut with such force that the saw teeth will be damaged.

From the foregoing description, it will be apparent that the herein described invention provides a saw which may be used for light or heavy duty; which is readily portable and may be moved from one job to another as required; a saw wherein the driving mechanism is of such construction that the weight of the driving mechanism may be utilized to force the saw, during the cutting stroke, into the material being cut; which is so constructed that broken-off or partial blades may be utilized; which embodies novel means for raising and lowering the saw blade during the cutting operation, and which may be so regulated that the force operating to push the blade into the work may be regulated to a greater or less amount as desired; and in which a power means is used for automatically raising the saw and driving mechanism as a unit to enable material to be placed in position for cutting.

I am aware that many changes may be made and numerous details of construction may be varied through a wide range without departing from the principles of this invention, and I therefore, do not purpose limiting the patent granted hereon otherwise than necessitated by the scope and spirit of the appended claims.

I claim as my invention:

1. A saw comprising a stationary upright guide member, a frame arranged for raising and lowering movement on said guide member, a reciprocable saw blade carried by said frame, power means for driving said blade carried by said frame, and means carried by said frame operable to alternately grippingly engage said guide member to raise said frame, power means and blade as a unit, and disengage the guide member, whereby the inherent weight of the frame, power means and blade moves them downwardly as a unit.

2. A saw comprising a pair of guide members, a frame arranged for raising and lowering movement on the guide members, a saw blade operatively supported on the frame, power means for driving the saw, and members respectively associated with said guides for alternately gripping the guides, and means driven by the power means and associated with one of said members for raising the frame, blade and power means as a unit in a series of raising movements.

3. A saw comprising a pair of guide members, a frame arranged for raising and lowering movement on the guide members, a saw blade operatively supported on the frame, power means for driving the saw, means cooperative with one of said guides and driven by the power means to raise the blade, frame and power means as a unit in a series of successive movements, and releasable means associated with a guide member enabling raising movement of the unit but restraining the same against reverse movement.

4. A saw comprising a pair of guide members, a frame arranged for raising and lowering movement on the guide members, a saw blade operatively supported on the frame, power means for driving the saw, means cooperative with one of said guides and driven by the power means to raise the blade, frame and power means as a unit in a series of successive movements, releasable means associated with a guide member enabling raising movement of the unit but restraining the same against reverse movement, and means for rendering the latter means inoperative, whereby the unit may freely move in the reverse direction.

5. A saw comprising a pair of guide members, a frame arranged for raising and lowering movement on the guide members, a saw blade operatively supported on the frame, power means for driving the saw, means cooperative with one of said guides and driven by the power means to raise the blade, frame and power means as a unit in a series of successive movements, releasable means associated with a guide member enabling raising movement of the unit but restraining the same against reverse movement, means for rendering the latter means inoperative, whereby the unit may freely move in the reverse direction, and means for retarding the reverse movement of said unit.

6. A saw comprising a frame structure, a saw blade carried by said frame, power means carried by the frame for driving the saw blade, said frame, blade and power means being arranged for raising and lowering as a unit, a guide element for said unit, a member mounted for tilting movement relative to said guide and arranged when substantially horizontal to be free relative to said guide and when tilted to frictionally grip the guide, means operated by the power means for tilting said member and cooperating with the same for raising said unit, and means operative in response to the movement of the saw blade for restoring the member to horizontal position, whereby the unit is free to move downwardly under its own weight.

7. A saw comprising stationary upright guide means, a frame arranged for raising and lowering movement on said guide means, a reciprocable saw blade carried by said frame, power means for driving said blade carried by said frame, and means carried by said frame intermittently operable to grip the guide means and raise said frame in a succession of upward movements, when the saw is running, whereby the saw blade may be automatically raised for the insertion of a member to be sawed.

8. In a saw, a stationary guide member, a frame mounted for raising and lowering movement on said guide member, a blade reciprocably carried by said frame, power means for driving the saw, a member arranged for gripped and released engagement with said guide, means cooperating with said member when it grips the guide for raising and lowering the frame in timed relation to the movement of the blade, and means carried by the frame for actuating the member to released position relative to the guide member in response to the lowering of the frame, whereby the frame is free to move downwardly under its own weight.

9. In a saw, a stationary guide member, a frame mounted for raising and lowering movement on said guide member, a blade reciprocably carried by said frame, power means for driving the blade, a plate having an aperture for receiving the guide member therethrough, a spring for normally tilting the plate to grip the guide member, cam actuated means acting on the plate when it grips said member to raise and lower the frame in timed relation to the movement of the blade, and means carried by the frame for moving the plate to a horizontal position in response to the lowering of said frame, said plate in its horizontal position being released relative to said guide, whereby the frame is free to move downwardly.

10. In a saw, a stationary guide member, a frame mounted for raising and lowering movement on said guide member, a blade reciprocably carried by said frame, power means for driving the saw, a member arranged for gripped and released engagement with said guide, means cooperating with said member when it grips the guide for raising and lowering the frame in timed relation to the movement of the blade, and means carried by the frame for actuating the member to released position relative to the guide member whereby the frame is free to move downwardly under its own weight.

EDWIN DE HAVEN CALDWELL.